US012328185B2

(12) United States Patent
Chermon et al.

(10) Patent No.: US 12,328,185 B2
(45) Date of Patent: Jun. 10, 2025

(54) PROCESSING INFORMATION RELATED TO ONE OR MORE MONITORED AREAS

(71) Applicant: D-FEND SOLUTIONS AD LTD., Raanana (IL)

(72) Inventors: Assaf Monsa Chermon, Kfar Yedida (IL); Nadav Arie, Tel Aviv (IL); Yaniv Benbenisti, Raanana (IL); Ben Stav, Raanana (IL)

(73) Assignee: D-FEND SOLUTIONS AD LTD., Raanana (IL)

( * ) Notice: Subject to any disclaimer, the term of this patent is extended or adjusted under 35 U.S.C. 154(b) by 182 days.

(21) Appl. No.: 17/456,798

(22) Filed: Nov. 29, 2021

(65) Prior Publication Data

US 2022/0329346 A1 Oct. 13, 2022

(51) Int. Cl.

| | |
|---|---|
| ***H04K 3/00*** | (2006.01) |
| ***B64C 39/02*** | (2023.01) |
| ***B64D 1/02*** | (2006.01) |
| ***G06K 9/00*** | (2022.01) |
| ***G06K 9/32*** | (2006.01) |
| ***G06T 7/11*** | (2017.01) |
| ***G08G 5/00*** | (2025.01) |

(52) U.S. Cl.
CPC ............. *H04K 3/825* (2013.01); *H04K 3/822* (2013.01); *H04K 3/92* (2013.01)

(58) Field of Classification Search
None
See application file for complete search history.

(56) References Cited

U.S. PATENT DOCUMENTS

| | | | | |
|---|---|---|---|---|
| 10,237,743 | B2 * | 3/2019 | Shattil | H04K 3/45 |
| 10,907,940 | B1 | 2/2021 | Parker et al. | |
| 11,521,128 | B2 * | 12/2022 | Moro, Jr. | G08G 5/006 |
| 11,698,462 | B1 * | 7/2023 | Archer | G01S 19/258 342/14 |
| 11,756,438 | B2 * | 9/2023 | Yocam | H04W 4/40 701/1 |
| 11,794,919 | B2 * | 10/2023 | Wiegman | G08G 5/0004 |
| 2016/0023760 | A1 | 1/2016 | Goodrich et al. | |
| 2017/0092138 | A1 | 3/2017 | Trundle et al. | |
| 2018/0227073 | A1 | 8/2018 | Hetsko et al. | |
| 2019/0199756 | A1 | 6/2019 | Correnti et al. | |
| 2020/0108926 | A1 | 4/2020 | Smith et al. | |
| 2020/0111374 | A1 | 4/2020 | Yocam et al. | |
| 2020/0247554 | A1 | 8/2020 | Zhang et al. | |
| 2020/0272827 | A1 * | 8/2020 | Morrow | B64D 1/02 |

(Continued)

*Primary Examiner* — Pablo N Tran
(74) *Attorney, Agent, or Firm* — Reches Patents

(57) ABSTRACT

A method for processing information related to one or more monitored areas, the method may include receiving by a central control unit, UAV indicators about at least one unmanned airborne vehicle (UAV) located within the one or more monitored areas; wherein the UAV indicators are generated by a preprocessing step that comprises extracting information that is embedded within sensed UAV communication, the sensed UAV communication is sensed by at least one sensor of a group of sensors; aggregating, by a central control unit, the UAV indicators, to provide aggregated information; and responding to the aggregated information, wherein the responding comprises at least one out of (i) outputting the aggregated information, and (ii) storing the aggregated information.

18 Claims, 7 Drawing Sheets

(56) References Cited

U.S. PATENT DOCUMENTS

| | | | |
|---|---|---|---|
| 2020/0363824 A1 | 11/2020 | Levin et al. | |
| 2020/0379122 A1 | 12/2020 | Tontiruttananon et al. | |
| 2021/0197967 A1 | 7/2021 | Song et al. | |
| 2023/0222920 A1* | 7/2023 | Wiegman ............. | G08G 5/0026 701/120 |

* cited by examiner

700

PROCESSING INFORMATION RELATED TO ONE OR MORE MONITORED AREAS

BACKGROUND

The popularity of commercial UAVs is growing rapidly. By year 2020, over one hundred million UAVs are expected to be in use. Until a few years ago, Unmanned Aerial Vehicles (UAV) were purely military aircrafts. Today, commercial UAVs are widely available, relatively inexpensive, and feature top-notch military-grade capabilities.

While most UAVs are used for legitimate and positive purposes, many are used irresponsibly or maliciously—risking aircrafts in airports, smuggling drugs and weapons into prisons, attacking or harassing political figures, and carrying-out terror acts.

Some anti-UAV systems may have a limited range of detection.

There is a growing need to provide an efficient solution for extending the range of detection.

SUMMARY

There may be provided systems, methods, and computer readable medium for processing information related to one or more monitored areas, as illustrated in the specification.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
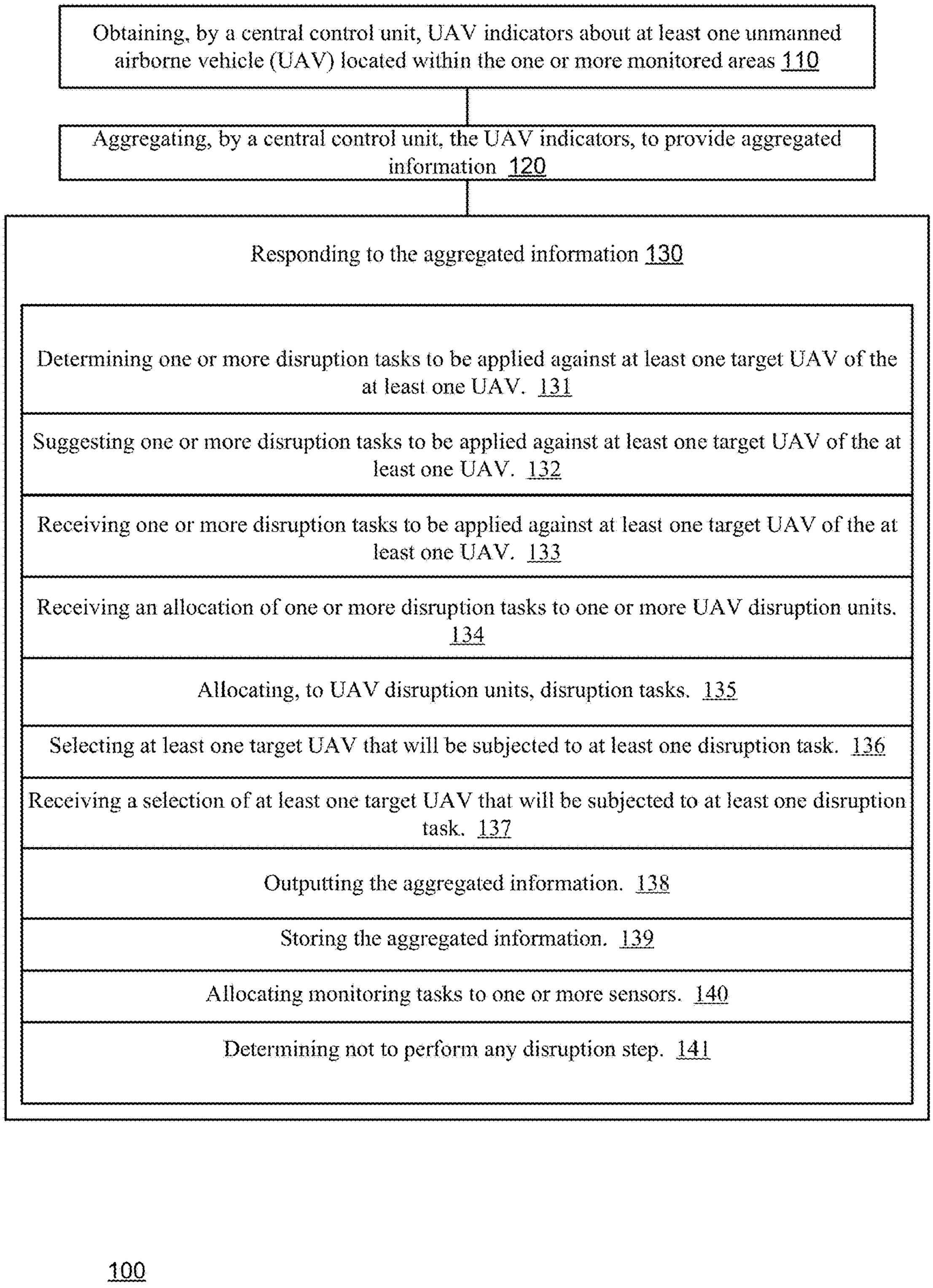
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central control unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to a sensor may be applied mutatis mutandis to a system, a central control unit, a sub-system and a UAV disruption unit. A sub-system may include a sensor and/or a UAV disruption unit and/or a preprocessor.

A disruption task is a task aimed to disrupt the UAV—for example prevent the UAV to complete a mission of the UAV, or delay the UAV from executing the mission, or take over the control of the UAV, preventing its remote controller from controlling it for a limited or unlimited time.

A monitoring task is a task for monitoring—it may include monitoring a UAV, its remote controller, or both for one or more reasons. It will usually involve dedicating resources for the purpose of receiving Radio Frequency (RF) signals transmitted by the UAV or by remote controller. A monitoring result may include extracting information included in any received RF communication. The extraction may include, for example converting the received Rf signals to digital and/or analog signals.

The term "task" may refer to a disruption task and/or a monitoring task.

There may be provided a method, a system, and a computer readable medium for processing information related to one or more monitored areas.

There may be provided a system that may include sensors (each with or without a local processing logic such as but not limited to a pre-processor), and a central control unit.

A sensor may include a RF sensing unit for sensing sensed information such as RF communication. A sensor that has a local processing logic such as a pre-processor may be configured to pre-process the sensed information and extract information embedded in the sensed information. Alternatively, the sensed information may be pre-processed by a pre-processor that does not belong to a sensor.

The pre-processed information may be sent to the central control unit that may perform additional processing, and then respond to the outcome of the processing. The pre-processing may be executed by the sensors or by a pre-processor that does not belong to the sensors.

The central control unit may receive UAV indicators that are indicative of a presence of one or more UAVs or remote controllers in one or more monitored area and may aggregate them (or fuse them) so that UAV indicators of the same UAV or remote controller would be joined together or identified as originating from the same UAV or remote controller.

The determining that two or more UAV indicators have originated from the same UAV in order to use them together in aggregation may include using one or more means—it could be via data that the UAV is transmitting like its identity, or through its location—two UAV indicators that indicate that the originating UAV is located approximately at the same GPS location and altitude, are probably originating from the same UAV, or through some communication parameters like the band frequency or timing (using the same time slots), or through several parameters together like a model and a frequency so that the system can deduce that two such UAV indicators have probably originated from the same UAV. Any other methods may be used for aggregating.

This aggregation causes the system to have a range that is an aggregated range of all sensors. By this it in fact expands the range that a single sensor with a dedicated local processing would have if it were standalone.

The system may also include one or more UAV disruption units. These units are able to initiate and perform a disruption task (partial or full), according to parameters that match a target UAV.

The sensors may also be paired or otherwise allocated to UAV disruption units. The UAV disruption units may receive information from the paired or allocated sensor using direct communication between them. They may both be united into a single unit.

UAV disruption units may be able to perform disruption tasks by receiving information directly from a sensor that is paired to them, or independently of sensors if they get information and/or commands and/or requests and/or suggestions that assist them in determining the parameters of a disruption task through other means, for example from the central control unit.

When the system determines (through its logic or via an order given by an operator) that it should take over or fend or otherwise disrupt a UAV, it may select an UAV disruption unit (or paired sensor and UAV disruption unit) to perform one or more disruption tasks to obtain this goal.

The system may execute one or more disruption tasks for take over of a UAV or for otherwise disrupting the operation of the UAV.

The central control unit may control one or more UAV disruption units and one or more sensors. The central control unit may allocate disruption tasks to one or more UAV disruption units and/or may allocate monitoring tasks to the one or more sensors.

The central control unit may determine which one or more UAV disruption units to use and/or may determine which disruption tasks to be executed and/or may determine which UAV should be a target UAV (subjected to one or more disruption tasks) in various manners and/or based on different rules and/or parameters.

For example—the selection of the one or more UAV disruption units to use for a disruption task may be based on one or more out of (a) a range from the target UAV or its remote controller or both, (b) a quality of reception of the target UAV communication by a sensor proximate to or paired to the UAV disruption unit, (c) whether the UAV disruption unit is busy with other tasks, (d) a power source of the UAV disruption unit (for example, the unit may be battery operated or connected to the grid), (e) a maximal power that the UAV disruption unit can transmit, (f) a type of antenna that is connected to the UAV disruption unit, (g) a number of transmission packets received from the UAV or the remote controller, by the full system or by a sensor proximate to or paired to the UAV disruption unit, (h) how recently were the target UAV or the remote controller received, by the full system or by a sensor proximate to or paired to the UAV disruption unit, (i) the band the target UAV or remote controllers are using, (j) the type of the target UAVs, (k) the direction the transmission antenna connected to the UAV disruption unit has the most gain (for example, if the antenna is directional, whether the target UAV is located in that direction), and (l) the altitude of the target UAV If a UAV disruption unit is paired to a sensor then the quality of reception (by the sensor) may influence on how successful the sensor is in decoding the data the UAV is transmitting which may help in a UAV take-over process by the UAV disruption unit.

The central control unit may select more than one sensor and/or pre-processor for reception and decoding of information from the UAV, that information would pass over to the UAV disruption unit (either directly in case the sensor and the UAV disruption unit are coupled in the same unit, or through communication through the central control unit or directly from unit to unit).

A UAV disruption unit may be connected to a battery pack, to a car battery, to an electrical grid, or be powered otherwise. This can affect the desirability of appointing it to perform one or more disruption tasks because its power source might be limited. It may also affect the maximal power the UAV disruption unit can transmit.

Multiple UAV disruption units may cooperate in synchronicity under the control of the central control unit. This may require clock synchronization but may provide a more effective attack.

The system may apply and/or the central control unit may control a coordination (or combination) of attacks from several UAV disruption units.

U.S. Pat. No. 10,728,906, which is incorporated herein by reference, is an example of sub-dividing a time slot of a wireless time division duplex communication link. During a time slot disruption signals of a plurality of frequency bands are transmitted during time intervals of the time slot.

A combination of attacks may include using multiple UAV disruption units for transmitting multiple disruption signals per time slot. At a certain time interval different UAV disruption units may transmit disruption signals at different frequencies. For example—different UAV disruption units may be allocated with different frequencies or frequency bands for the entire time slot. For example—each UAV disruption unit can transmit for a longer period of time in each of a fewer frequencies or all UAV disruption units can transmit in all frequencies but each of the UAV disruption units will send disruption signals to the same frequency at different times.

The combination of attacks may be used to operate several possibilities for attack (e.g. if the system cannot determine in what frequency is the UAV expecting its remote controller to transmit) simultaneously, where different UAV disruption units may apply these different attacks that cover the several possibilities.

The combination of attacks may include using different UAV disruption units for different roles and/or different types of disruption tasks. For example—one UAV disruption unit can be used to interrupt communication and the other UAV disruption unit may be used for transmitting alternative communication for the purpose of taking over the target UAV communication.

A UAV disruption unit that is closer to the target UAV may be used to transmit interruption signals while alternative communication can be transmitted from a more distant UAV disruption unit. As by nature, interruption signals are more effective the higher the power they are received with is, closer UAV disruption units can more effectively interrupt communication. This is not necessarily the case with alternative communication that can be received in a lower power.

In other cases, the target UAV communication may use noise estimation in order to determine which of alternative frequency bands or communication formats to use. A noise transmitted by a first UAV disruption unit in certain patterns can cause the target UAV to determine to communicate in a certain frequency band or communication format which may be more favorable for a take over. This take over can be performed by a second UAV disruption unit in coordination with the first UAV disruption unit.

Sensors may assist a disruption task performed by the UAV disruption units—for example by monitoring the communication between the target UAV and its remote controller which can help to determine the status of the target UAV, and accordingly progress with the disruption task.

Multiple UAVs that are located within the one or more monitored area may be attacked during an overlapping window of time. As each UAV disruption unit can conduct an independent take-over, several such attacks may happen in parallel within the same window of time. Each disruption task may utilize a UAV disruption unit, but if there are several UAV disruption units available, more than one attack may be performed at the same time. Alternatively, several UAV disruption units may coordinate several attacks in parallel, all taking part in each of the disruption tasks.

Attacks may be prioritized by one or more parameters—for example, by threat level, range of flight of the UAV, or other means—and appropriate UAV disruption units and sensors may be selected by the central control unit according to that priority.

The central control unit may prioritize attacks (disruption tasks) according to many different parameters such as the location of the UAV, an amount of weight (payload) the UAV may carry, the range of flight of such UAV, pre-knowledge about the UAV identity (e.g. recognition of that specific UAV as being one that has already attacked or flew unauthorized in the vicinity but was not captured or was captured and returned to its owner), UAV speed, UAV altitude, UAV battery charge, a direction of a camera of the UAV is pointed at, a location of an operator of the UAV, a distance between the UAV and its operator etc. Appropriate UAV disruption units and sensors may be selected by the central control unit according to that priority. The prioritization may be done on a UAV disruption basis or on a system basis.

Each sub-system that includes a sensor, UAV disruption unit and a local processing unit may function independently, if it is set to do so; for example—in case it is disconnected from the central control unit. In such case of disconnection, the sub-system may initiate an attack automatically or via an order given by a local human operator.

Sensors, UAV disruption units, such sub-systems may be updated with data that will assist during future detections or attacks, with data on their area (e.g. maps or satellite images), or with software versions. This update may occur through a local update or through a central update via the central processing unit.

When there is a need to update software versions, maps, databases etc. each unit, sensor, UAV disruption unit can be updated separately, or together.

A system that includes sub-systems and/or sensors and/or UAV disruption units and a central control unit may be considered to be updated only after the central control unit has transferred the new software version to all sub-systems and/or sensors and/or UAV disruption units and the new software version was installed or after each of the sensors and/or UAV disruption units has been updated locally.

Sensors may update the central control unit with their status of functioning, range, availability etc. This may allow the central control unit to determine their future usage or the level of trust it gives to information they provide.

The central control unit may include a distributed array of controllers.

One or more controllers may be selected (for example by a human), at one or more time periods to act as the central control unit. The selection may be according to a predefined schedule, based on the health of other controllers, and the like.

The central control unit may be physically and/or logically separated from other sub-systems, sensors and UAV disruption units.

There may be one or more user interfaces for interfacing with the central control unit. This allows to control and/or interact with the central control unit by one or more operators.

A sub-system can be set to respond automatically when finding a UAV threat and take-over that UAV according to pre-set parameters (e.g. UAV entered a protected area that was defined in the system) and cause the UAV to perform a certain action (e.g. land in a designated place, perform a flight plan, etc.) depending on the area it was captured (so as to not take over a UAV and fly it across a landing corridor in an airport) etc.

A sub-system may also be set to a manual operation mode where it attacks only when an operator initiates that attack. In this mode it does not perform automated disruption task.

A sub-system may operate under the control of the central control unit but may also operate in a stand-alone mode—for example when it is disconnected from the central control unit and/or from other sub-systems.

A sub-system may be programmed not to operate or at least not to initiate any attack when it is disconnected from the central control unit and/or from other sub-systems.

In a stand-alone mode, the sub-system may attack automatically with complete disregard to the rest of the sub-systems or the central logic processing unit.

There may be provided a central control unit that may control multiple sub-systems (each including one or more sensors and one or more UAV disruption units).

The central control unit may be included in a computerized system such as a single server that may be located in remote to the sub-systems. This may empower organizations to intuitively safeguard vast expanses of land from rogue UAVs and quickly scale up for virtually any operational requirement.

The central control unit may provide a central management solution designed to control multiple sub-systems that may detect rogue UAVs, identify them and take control of them. By controlling multiple sub-systems remotely from a single server, the solution facilitates expanded and uninterrupted coverage for rogue UAV detection and mitigation—even without increasing the number of personnel needed to operate the multiple sub-systems.

The central control unit may be beneficial for organizations that need to secure large areas—including airports, border forces, large critical infrastructure facilities and outdoor events, such as marathons.

The central control unit may be beneficial for organizations that need to secure multiple areas that are physically separated.

This central management solution may take organizations from 'point protection' via a single sensor to securing vast expanses of land using multiple sensors. Since the central control unit requires the same amount of operating personnel as a single sub-system, it may be an efficient solution for safeguarding against rogue UAVs in massive areas.

The central control unit may seamlessly integrate into third-party command and control systems—for example by using APIs or other means.

APIs or other means may be used to transfer information about UAVs detected by the sensors and about the health of the sub-systems. Additionally, or alternatively, the APIs or other means can be used to receive settings (like a protection plan—that may include disruption tasks, selection rules, and the like), system orders (like on or off), and attack orders from a command and control of another system.

The central control unit may aggregate information from multiple sensors to provide aggregated information that may be outputted to various other systems (such as control and command systems) via the APIs or other means.

The central control unit may receive requests and/or commands from other systems and convert them to disruption tasks and/or monitoring tasks and/or may allocate and send disruption tasks and/or monitoring tasks to the UAV disruption units and/or the sensors, respectively.

The aggregated information may be formed so it may be displayed over any platform and/or displayed in any manner—for example over a map-based command and control platforms with an option to trigger mitigation via the other systems and/or over a display of any sub-system.

By aggregating information from multiple sensors that may be distributed over one or more locations to monitor one or more monitored areas, the central control unit may provide unified, intuitive operational awareness to support mission-critical decisions. This may also include eliminating duplications if multiple sensors detect the same UAV. The central control unit may select (for example the best) UAV disruption unit to initiate mitigation, after factoring for interference, radio parameters, ranges, and other parameters.

UAV threats vary by mission, use case and environment, the system may be configured according to different deployment options, providing optimized coverage for a wide variety of scenarios, conditions and terrain types, with rapid and easy set-up.

The central control unit and/or the sub-systems and/or the sensor and/or the UAV disruption unit can be affixed to vehicles or ships, covertly if necessary, set up as stationary deployments on low or high ground, or used tactically in the field. The hardware of the central control unit may be lightweight and compact, and can be rapidly taken apart, moved and reassembled in minutes.

FIG. 1 illustrates method 100 for processing information related to one or more monitored areas.

Method 100 may start by step 110 of obtaining, by a central control unit, UAV indicators about at least one unmanned airborne vehicle (UAV) located within the one or more monitored areas. The obtaining may include receiving the UAV indicators—for example—receiving the UAV indicators from sensors or from other sources. For simplicity of explanation the following text will refer to sensors.

The central control unit is central in the sense that it may process UAV indicators received from a group of sensors.

The central control unit may include one or more processing circuits that may be distributed or not.

The group of sensors may include radio frequency (RF) receivers. The RF receivers may monitor communications related to one or more UAVs. The RF receivers may be passive RF receivers, active RF receivers, may include at least one directional RF receiver, may include any number of antennas, may include any type of antennas, may include at least one omnidirectional receiver, may be significantly spaced apart from each other, may include at least one sensor that is integrated with and/or included in and/or permanently allocated to a certain UAV disruption unit, may include at least one sensor that is a stand-alone sensor that it is not integrated with and/or included in and/or permanently allocated to a certain UAV disruption unit. A sensor may be temporarily paired to a UAV disruption unit. A UAV disruption unit may be temporarily or permanently be disabled (for example based on their location and/or transmission permissions and/or licenses) from transmitting disrupting signals.

A UAV disruption unit is a unit that is configured to transmit one or more transmitted UAV disruption signals and/or generate one or more UAV disruption signals and/or generate one or more signals that are converted to the one or more transmitted UAV disruption signals. The conversion may include digital to RF conversion, amplification, attenuation, format changing, transmission via an antenna, and the like.

The UAV indicators are generated by a preprocessing step that may include extracting information that is embedded within sensed UAV communication, the sensed UAV communication is sensed by at least one sensor of a group of sensors.

Step 110 may include at least one out of:

Receiving of the UAV indicators.

Generating the UAV indicators.

Executing the preprocessing step. The preprocessing step may include any processing measure that may precede one or more other steps of method 100.

Receiving the sensed UAV communication.

Method 100 may also include sensing the sensed UAV communication by the one or more sensors.

The UAV indicators may include one or more UAV indicators related to the same UAV. The one or more UAV indicators related to the same UAV may be sensed by the same sensor or by more than a single sensor.

The at least one UAVs may include more than a single UAV that is associated with more than a single UAV indicator.

A UAV indicator may include at least one of (i) a UAV identifier—for example a unique UAV ID, MAC address, and the like, (ii) a UAV model identifier, (iii) location of the UAV—for example coordinates and/or direction and/or altitude, (iv) location of the UAV remote controller, (v) location of the UAV 'home' (a location the UAV may return to automatically in case it is ordered to do so or in case an emergency plan is initiated, usually as a response to a communication disconnection between the UAV and its remote controller), (vi) additional telemetry parameters.

The information that is embedded within sensed UAV communication may be included in any frame, packet, or any communication protocol.

The extraction of the embedded information may differ from measuring a RF parameter of the UV communication—such as a carrier frequency of the UAV communication, modulation of the UAV communication, a duty cycle of the UAV communication, and the like.

Step 110 may be followed by step 120 of aggregating, by a central control unit, the UAV indicators, to provide aggregated information.

The aggregating of information may include removing redundant information, combining information, fusing information, disregarding information, solving conflicts between information of different UAV indicators, fusing information, extrapolating information, interpolating information, correcting information, or otherwise processing information regarding different UAV indicators.

The aggregating of information may include processing two or more UAV indicators related to the same UAV by removing redundant information from the two or more UAV indicators related to the same UAV, combining information from the two or more UAV indicators related to the same UAV, fusing information from the two or more UAV indicators related to the same UAV, disregarding information from the two or more UAV indicators related to the same UAV, solving conflicts between information of the two or more UAV indicators related to the same UAV, fusing information from the two or more UAV indicators related to the same UAV, extrapolating information from the two or more UAV indicators related to the same UAV, interpolating information from the two or more UAV indicators related to the same UAV, correcting information from the two or more UAV indicators related to the same UAV, or otherwise processing information regarding the two or more UAV indicators related to the same UAV.

The two or more UAV indicators related to the same UAV may be based on sensed information that is sensed by one or more sensors.

Step 120 may be followed by step 130 of responding to the aggregated information.

The responding can be executed by the central control unit, may be executed by a combination of the central control unit and at least one other entity (human or non-human), and the like.

The responding may include at least one out of:

- Determining one or more disruption tasks to be applied against at least one target UAV of the at least one UAV. (Step 131).
- Suggesting one or more disruption tasks to be applied against at least one target UAV of the at least one UAV. (Step 132).
- Receiving one or more disruption tasks to be applied against at least one target UAV of the at least one UAV. (Step 133). The receiving may be from any entity—human or non-human.
- Receiving an allocation of one or more disruption tasks to one or more UAV disruption units. (Step 134).
- Allocating, to UAV disruption units, disruption tasks. (Step 135). The allocating may include allocating disruption tasks aimed to the same UAV target—or aimed to different UAVs.
- Selecting at least one target UAV that will be subjected to at least one disruption task. (Step 136).
- Receiving a selection of at least one target UAV that will be subjected to at least one disruption task. (Step 137).
- Outputting the aggregated information. (Step 138).
- Storing the aggregated information. (Step 139). The storing may be in a volatile memory, in a non-volatile memory, and the like.
- Allocating monitoring tasks to one or more sensors. (Step 140).
- Determining not to perform any disruption step. (Step 141).

Any combination of the responding steps may be provided (unless the steps contradict each other (for example—step 141 cannot be added to step 131 or to step 135).

An example of a combination including allocating one or more disruption tasks and one or more monitoring tasks.

Another example of a combination of step 134 and one or more of steps 131-134.

Step 131 and/or step 132 may include step 136 and/or step 137. For example the determining of the disruption tasks may include selecting the at least one or more target UAV and/or may be responsive to the selected at least one or more target UAV.

The disruption tasks (mentioned in steps 131-135) may differ from each other by any manner—for example may differ from each other by at least one out of:

- Transmission frequencies of disruption signals associated with the different disruption tasks.
- Timing of transmissions of the disruption signals associated with the different disruption tasks.
- Data transmitted within the disruption signals associated with the different disruption tasks.
- Communication protocol used in the transmission of the disruption signals associated with the different disruption tasks.

The disruption tasks may include (a) a first disruption task of interrupting a reception by the certain UAV, of a legitimate signal sent to the UAV by a remote controller of the UAV, and (b) a second disruption task of sending a false signal for taking over the UAV.

The disruption tasks may include (a) a first disruption task of disrupting a communication conveyed over a first communication channel, and (b) a second disruption task of disrupting a communication conveyed over a second communication channel.

The first communication channel may have a different role than the second communication channel. For example—the second communication channel may be (a) an auxiliary communication channel in which the UAV and/or the remote controller may communicate when the first communication channel is jammed or exhibits a lower than desired quality, (b) an emergency communication channel used when the UAV faces an emergency scenario, (c) a reconnect communication channel used when the UAV is disconnected from the remote controller and decided to reconnect with the remote controller, or (b) a restart communication channel used when the UAV is restarted or the communication should be restarted.

The disruption tasks may be aimed to disrupt at least one target UAV. While step 110 refers to UAV indicators about at least one unmanned airborne vehicle (UAV) (may be referred to as at least one sensed UAV—as communication regarding the UAV is sensed)—the at least one target UAV is the subject of disruption tasks. A sensed UAV may or may not be a target UAV. For example—assuming that there are multiple sensed UAVs—the one, some, or all of the multiple sensed UAVs may be target UAVs.

Step 131 may include determining disruption tasks based on risk imposed by the at least one UAV. The risk may be an actual risk, a potential risk, an estimated risk.

Step 131 may include prioritizing disruption tasks over non-allocated disruption tasks.

Step 131 may include selecting the UAV disruption units of a set of UAV disruption units. The set may include any number of UAV disruption units. The set may be in communication with the central control unit.

The selecting may be based on at least one out of:

Locations of UAV disruption units of the set of UAV disruption units.

A location of at least one target UAV.

A location of at least one remote controller of the at least one target UAV.

A location of at least one home (default point of landing of the UAV when communication is disrupted).

Power supply parameters of the UAV disruption units of the set. For example—the amount of available power, power consumption of the UAV disruption unit, type of power supply—battery, generator, power grid.

One or more transmission parameters of the UAV disruption units of the set.

i. The one or more transmission parameters may include a gain of transmission antennas.

ii. The one or more transmission parameters may include a maximal power of a transmitted disruption signal.

Estimations of success of disruption attempts to be made by different UAV disruption units of the set.

Strength or quality of reception signals, time passed since the last reception, total number of receptions received from the sensors and spatial relationships between the sensors and the UAV disruption units.

At least one previous encounter with one of more UAVs of the at least one UAV.

At least one previous encounter with a UAV of a UAV type that corresponds with a type of one of the at least one UAV. The UAV type may be the manufacturer of the UAV, a model of the UAV, a modem of the UAV, a communication protocol used by the UAV.

Step 136 of selecting at least one target UAV may be responsive to at least one out of (any of the parameters may be measured or detected or evaluated or verified or projected or estimated):

UAV payload parameter. For example—whether the UAV carries or is suspected to carry, or has the ability to carry) a payload, a size of the payload, the type of the payload (for example communication payload, jamming payload, explosive payload, disposable payload, non-disposable payload), risk (potential, actual, estimated and the like) of the payload.

UAV propagation parameter. For example speed, elevation, acceleration, direction of progress, flying pattern.

UAV health parameter. The health parameter may be the state of one or more units, faults, battery state, available battery charge, and the like.

At least one spatial relationship between the at least one UAV and at least one corresponding remote controller.

At least one previous encounters with one of more UAVs of the at least one UAV.

At least one previous encounter with a UAV of a UAV type that corresponds with a type of one of the at least one UAV.

The sensors are radio frequency receivers.

The monitoring tasks of step 140 may be for evaluating a success of one or more disrupting tasks—or for any other purpose—for example for changing the allocation of sensors per the one or more monitored areas.

Step 138 of outputting the aggregated information may include at least one out of:

Sending the aggregated information to at least one remote system. The remote system may be a remote computer, a remote man machine interface, and the like.

Outputting the aggregated information to a display.

Displaying the aggregated information.

Generating any human perceivable indicator (sound, tactile, and the like) regarding the aggregated information.

Figure 2:
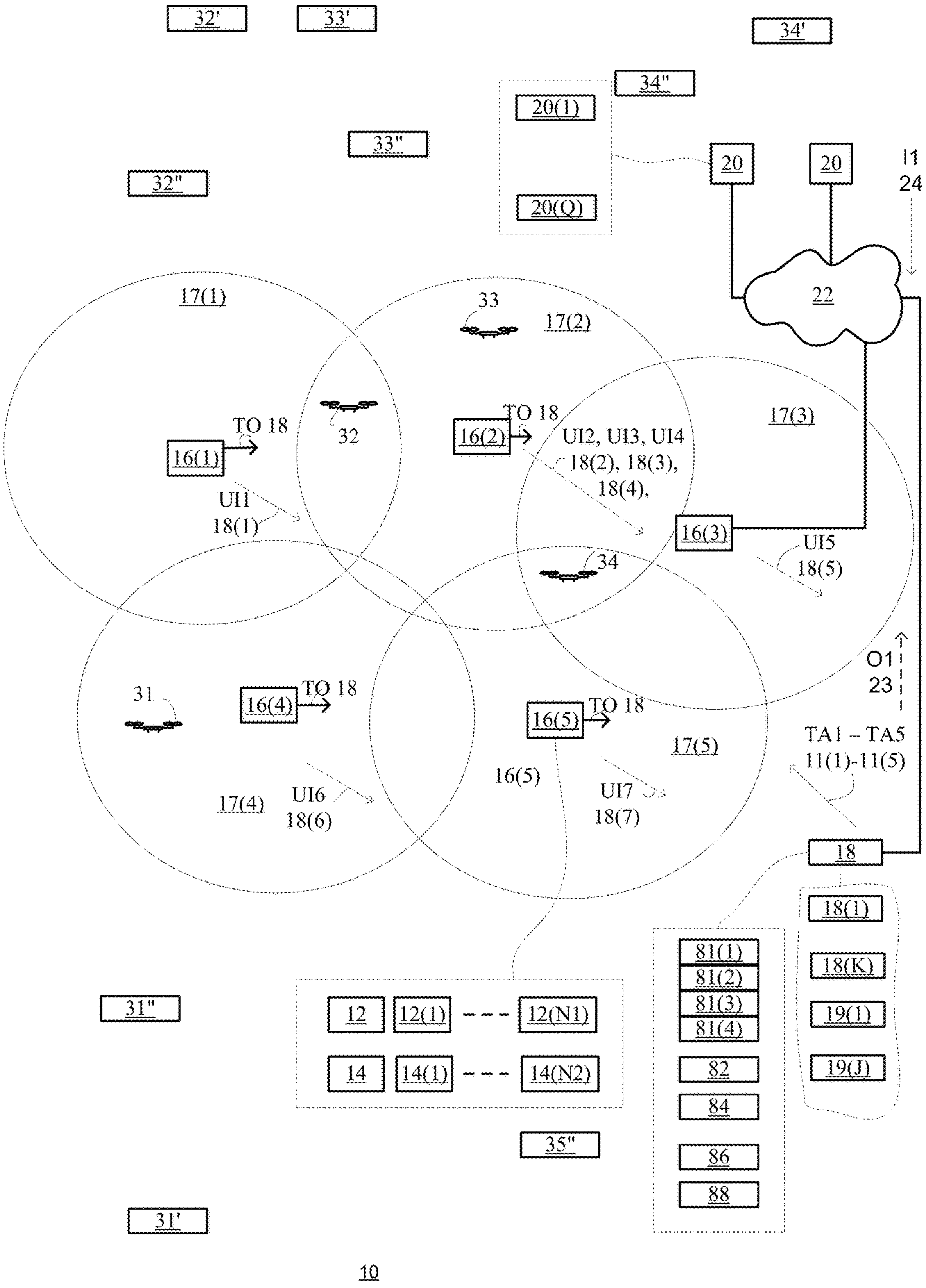
FIG. 2 illustrates an example of a system, other systems, monitored areas, UAVs and UAVs remote controllers.

FIG. 2 illustrates an example of a system 10 and its environment.

The system includes a central control unit 18 and five sub-systems 16(1)-16(5). The central control unit 18 may execute method 100. It should be noted that the central control unit may be located within one or more of the sub-systems and/or within any of the other systems 20. One or more computerized entities (may include one or more processing circuits) may be determined in any manner and in any frequency and/or in response to any event).

The environment includes five detection areas 17(1)-17(5) (that correspond to monitored areas), third party systems (also referred to as other systems) 20, and network 22. The central control unit 18, five sub-systems 16(1)-16(5) and other systems 20 may communicate using one or more network such as network 22.

Each of the other systems may include multiple (Q) components 20(1)-20(Q) such as a processor, a communication unit, a man machine interface (may be a display), and the like.

The five detection areas 17(1)-17(5) are the detection area of the five sub-systems 16(1)-16(5). First till fifth detection areas 17(1)-17(5) are the detection areas of the first till fifth sub-systems 16(1)-16(5). Monitored areas are areas that are defined as areas of interest in any manner and by any entity—operator, and the like. In order for a monitored area to be covered by one or more sensors, the monitored area needs to be included inside at least one detection area of the one or more sensors. For simplicity of explanation it is assumed that the entire first to fifth detection area form a monitored area.

While FIG. 2 illustrates the five detection areas as having a circular shape and being equal to each other—it should be noted that the detection areas may differ from circular detection areas (for example when using directional antennas and/or when the area topography forms gaps or other deviations in the detection area) and/or they may differ from each other by size and/or shape.

FIG. 2 illustrates first till fourth UAVs 31-34 that are controlled by first till fourth remote controllers 31'-34' respectively and have first till fourth homes 31"-34" respectively. A home is a default point for the UAV to return to and land at when communication is disrupted.

The first UAV 31 is currently located within the fourth detection area 17(4). The second UAV 32 is currently located within the first and second detection areas 17(1) and 17(2). The third UAV 33 is currently located within the second detection area 17(2). The fourth UAV 34 is currently located within the second, third and fifth detection areas 17(2), 17(3) and 17(5).

The first sub-system 16(1) generates a first UAV indicator UI1 18(1) (regarding the second UAV 32) and sends it to the central control unit 18.

The second sub-system 16(2) generates a second UAV indicator UI2 18(2) (regarding the second UAV 32), generates a third UAV indicator UI3 18(3) (regarding the third UAV 33), generates a fourth UAV indicator UI4 18(4) (regarding the fourth UAV 34), and sends all three UAV indicators to the central control unit 18.

The third sub-system 16(3) generates a fifth UAV indicator UI5 18(5) (regarding the fourth UAV 34) and sends it to the central control unit 18.

The fourth sub-system 16(4) generates a sixth UAV indicator UI6 18(6) (regarding the first UAV 31) and sends it to the central control unit 18.

The fifth sub-system 16(5) generates a seventh UAV indicator UI7 18(7) (regarding the fourth UAV 34) and sends it to the central control unit 18.

Figure 3:
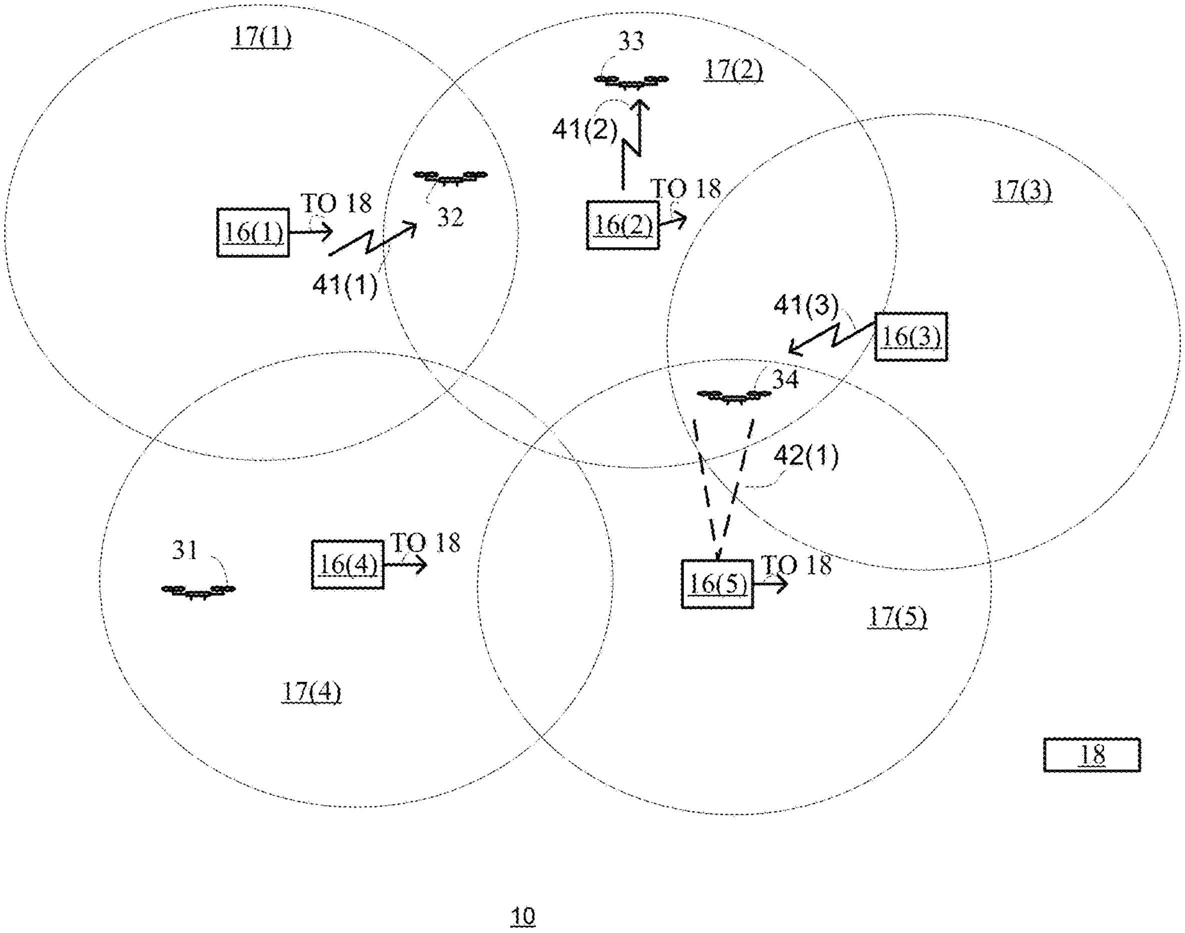
FIG. 3 illustrates an execution of various tasks.
Figure 4:
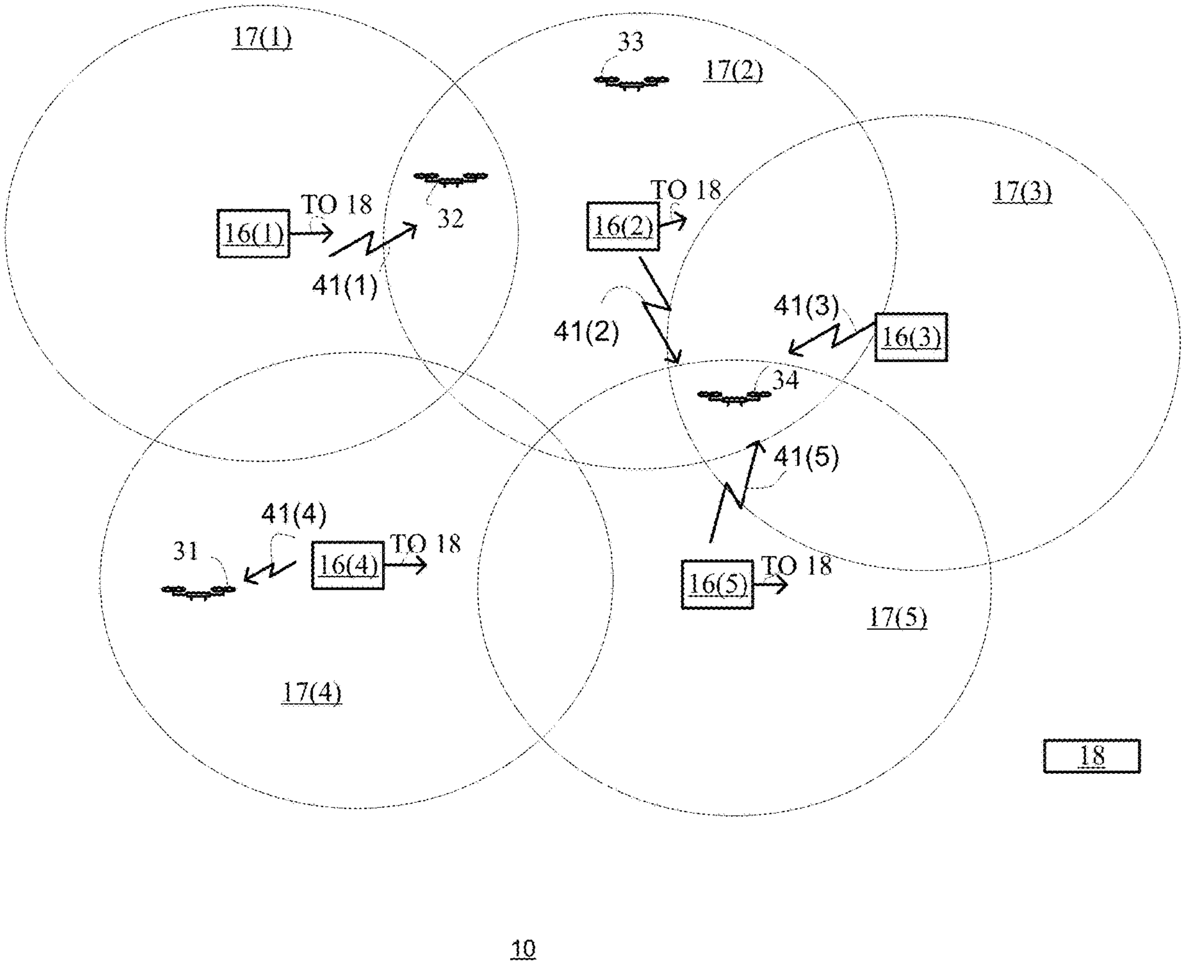
FIG. 4 illustrates an execution of various tasks.

It should be noted that a UAV indicator may be generated multiple times per second, per a few seconds, per a minute, and the like. The UAVs may also move over time and thus may be associated with different UAV indicators associated with different locations. For simplicity of explanation—only a single UAV indicator per UAV/sub-system is illustrated in FIGS. 2-4.

The central control unit 18 may receive input I1 24 from the other systems 20, and may send the systems output O1 23.

The input I1 24 may include requests to obtain information generated by the central control unit 18 and/or by any of the sub-systems, may include information regarding UAVs, requests to execute disruption tasks, list of possible disruption tasks that can be executed by the system, risk information, software updates, commands (such as disruption and/or monitoring tasks to apply, rules for making any decision related to the operation of the central control unit 18—including how to allocate tasks, how to select UAV disruption units, how to operate a sensor, how to determine a task).

The output O1 23 may be information generated by the central control unit 18 and/or by any of the sub-systems.

The information may include aggregated information 82 and/or UAV information 81(1)-81(4)—regarding the first till fourth drones, status information 84 or the central control unit, UAV indicators UI1-UI7 18(1)-18(7), status of sub-systems 86, activity log 88 regarding tasks and/or the impact of the execution of tasks, and the like.

Any of the five sub-systems may be replaced by a sensor 12 and/or a UAV disruption unit 14. The pre-processor 12(1) is illustrated as being included in the sensor 12—but it may be located outside the sensor. The sensor 12 is illustrated as including multiple (N1) components 12(1)-12(N1), and the UAV disruption unit 14 is illustrated as including multiple (N2) components 14(1)-14(N2). In FIG. 2 the sensor 12 and the UAV disruption unit 14 are illustrated as being included in the fifth sub-system 16(5).

The components 12(1)-12(N1) of the sensor may include an antenna, RF circuitry, signal analyzer, local controller/preprocessor, memory unit, man machine interface, communication unit, power supply, and like.

The components 14(1)-14(N2) of the UAV disruption unit 14 may include an antenna, RF circuitry, signal generator, transmitter, local controller/processor, memory unit, man machine interface, communication unit, power supply, and like.

The sensor and the UAV disruption unit may share at least one component (for example antenna, RF circuitry, local processor, communication unit, man machine interface, power supply) or may not share any component.

The sensor and/or the UAV disruption unit may include more than one antenna, or may include multiple other components of the same type.

The central control unit 18 may include multiple components such one or more controllers 18(1)-18(K), and additional components 19(1)-19(J) such as a communication unit, memory unit, a man machine interface, and the like.

In FIG. 2 the central control unit 18 determines that the first drone 31 should not be monitored and not be disrupted, and that the second, third and fourth drones 32-34 should be disrupted—and sends five task allocations TA1-TA5 11(1)-11(5) to the five sub-systems. It should be noted that more than one task can be concurrently allocated to the same sub-system and that the sub-system may execute more than one task at a time. For simplicity of explanation only a single task is shown per sub-system.

In the example related to FIG. 3—these tasks allocations include three disruption tasks and one monitoring task.

FIG. 3 illustrates that (a) the first sub-system 16(1) executes a first disruption task 41(1) for disrupting the second UAV 32, (b) the second sub-system 16(2) executes a second disruption task 41(2) for disrupting the third UAV 33, (c) the third sub-system 16(3) executes a third disruption task 41(3) for disrupting the fourth UAV 34, (d) the fourth sub-system is instructed not to disrupt any UAV and may keep the sensing for UAVs in any monitored area within the fourth detection area, and (e) the fifth sub-system 16(3) executes a monitoring task 42(1) for monitoring the success of the third disruption task.

In the example related to FIG. 4—these tasks allocations include five disruption tasks.

FIG. 4 illustrates that (a) the first sub-system 16(1) executes a first disruption task 41(1) for disrupting the second UAV 32, (b) the second sub-system 16(2) executes a second disruption task 41(2) for disrupting the fourth UAV 34, (c) the third sub-system 16(3) executes a third disruption task 41(3) for disrupting the fourth UAV 34, (d) the fourth sub-system 16(4) executes a fourth disruption task 41(4) for disrupting the first UAV 31, and (e) the fifth sub-system 16(3) executes a fifth disruption task 41(5) for disrupting the fourth UAV 34.

In the example of FIG. 4 the second sub-system 16(2) is closer (in relation to the fifth and third sub-systems) to the third UAV and to the third controller 34'—and may, for example, mask the signal of the third remote controller while the fifth and third sub-system may transmit take over signals.

Any allocation of tasks may be provided—according to any of the example sent in the application.

Figure 5:
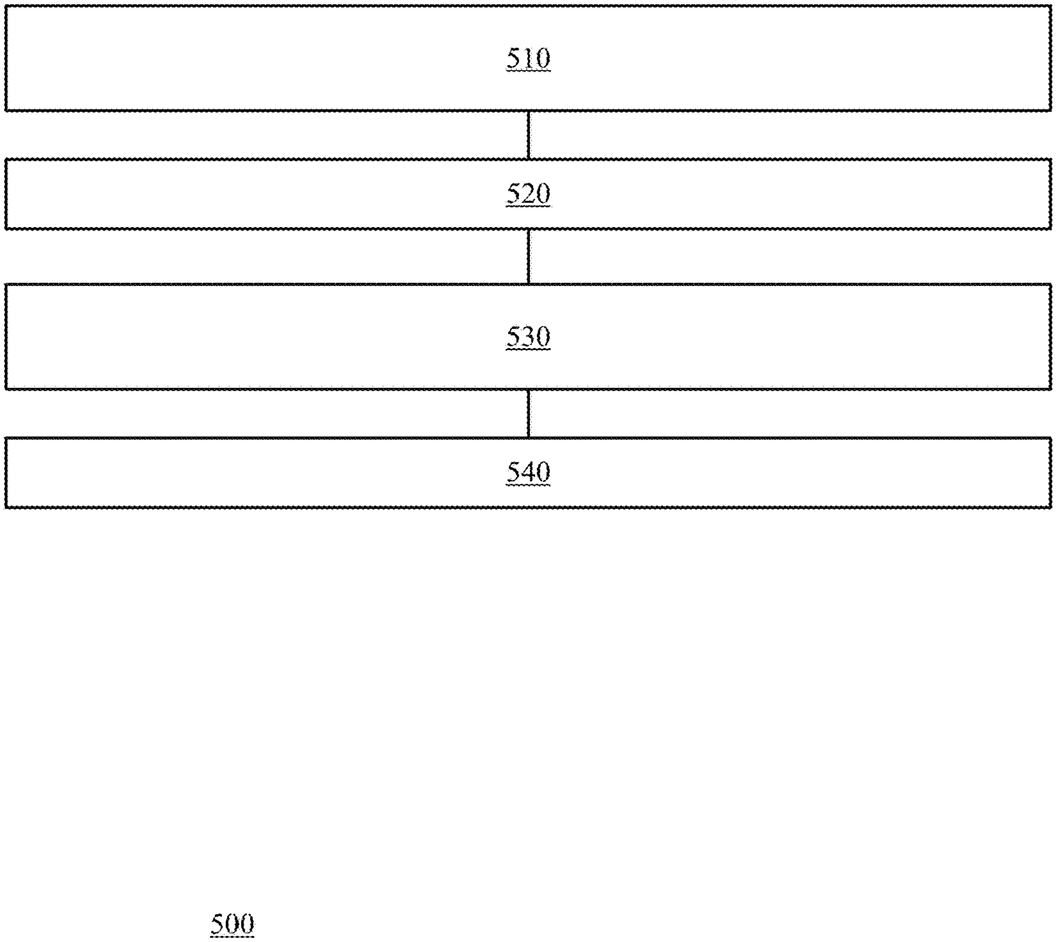
FIG. 5 illustrates an example of a method.

FIG. 5 illustrates method 500 for processing information related to one or more monitored areas.

Method 500 may be executed by a central control unit.

Method 500 may include step 510 of receiving, by a central control unit, UAV indicators about at least one unmanned airborne vehicle (UAV) located within the one or more monitored areas.

Step 510 may be followed by step 520 of generating, by a central control unit and based on the UAV indicators, UAV information for each one of the at least one UAV, wherein UAV information of a certain UAV is generated based on two or more UAV indicators related to the a certain UAV.

The UAV information may be generated by fusing or otherwise aggregating information of UAV indicators that relate to the same UAV. This determining that two or more UAV indicators have originated from the same UAV in order to use them together in can be done via data that the UAV is transmitting like its identity, or through its location—two UAV indicators that indicate that the originating UAV is located approximately at the same GPS location and altitude, are probably originating from the same UAV, or through some communication parameters like the band frequency or timing (using the same time slots), or through several parameters together like a model and a frequency so that the system can deduce that two such UAV indicators have probably originated from the same UAV. Any other methods may be used for aggregating Step 520 may be followed by step 530 of allocating disruption tasks to be applied against at least one target UAV of the at least one UAV.

Step 530 may be followed by step 540 of responding to the UAV information, wherein the responding comprises at least one out of (i) outputting the UAV information, and (ii) storing the UAV information.

Any reference to method 100 (or one or more steps of method 100) may be applied mutatis mutandis to method 500 (or one or more steps of method 100).

Figure 6:
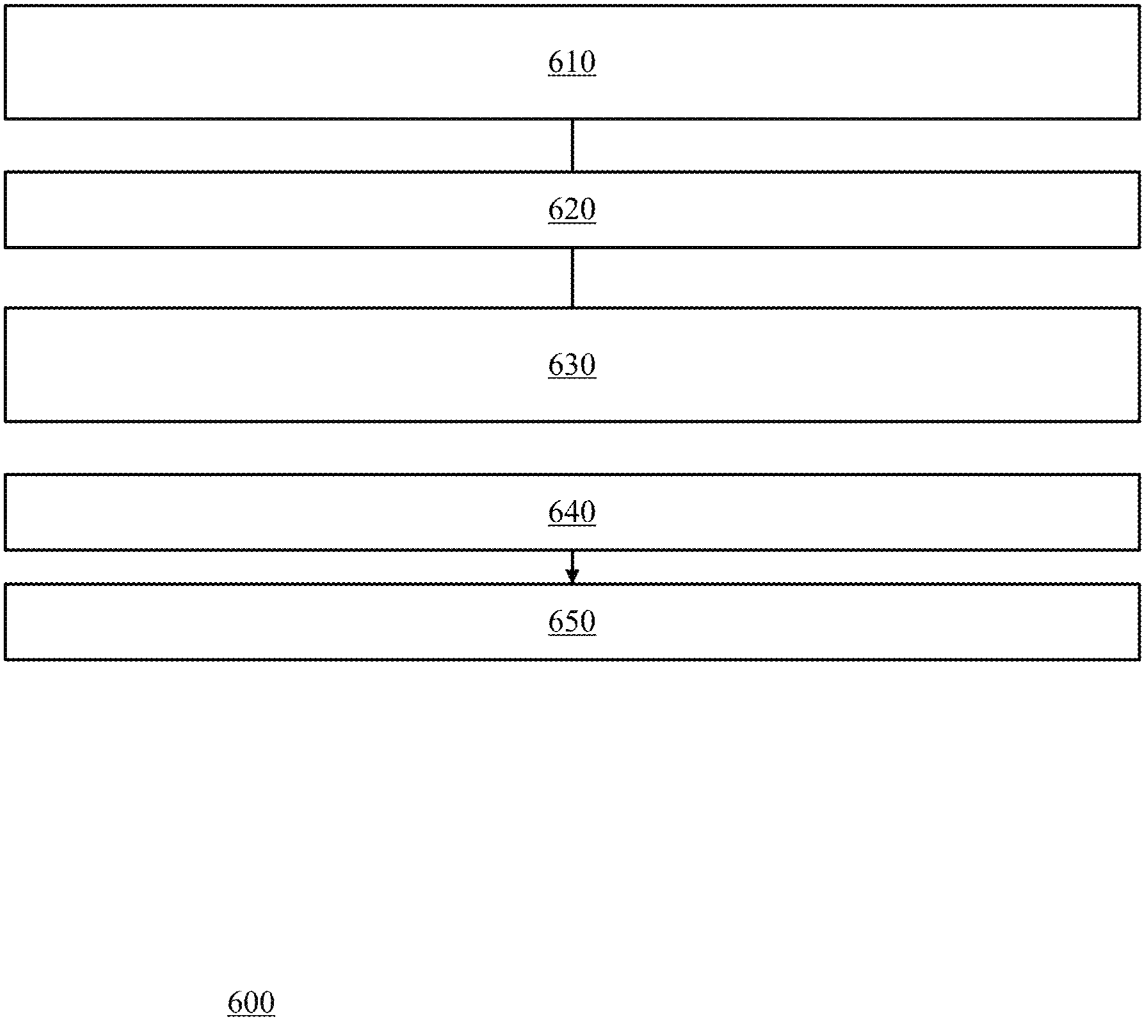
FIG. 6 illustrates an example of a method.

FIG. 6 illustrates method 600.

Method 600 may be executed by a sub-system such as but not limited sub-systems 16(1)-16(5) of FIGS. 2-4.

Method 600 is for executing tasks related to an unmanned airborne vehicle (UAV).

Method 600 may start by step 610 of sensing UAV communication by a sensor.

Step 610 may be followed by step 620 of preprocessing the sensed UAV communication to provide a UAV indicator. The preprocessing may include extracting information that is embedded within sensed UAV communication.

Step 620 may be followed by step 630 of sending the UAV indicator to a central control unit.

Method 600 may also include step 640 of receiving, from the central control unit, a request to execute a task, wherein the task is a monitoring task or a disruption task.

Step 640 may be followed by step 650 of executing the task.

The task may be allocated in response to the provided UAV indicator. Alternatively—the task of steps 640 and/or 650 may be sent to the sub-system in response to one or more UAV indicators send to the central control unit by another sub-system.

Figure 7:
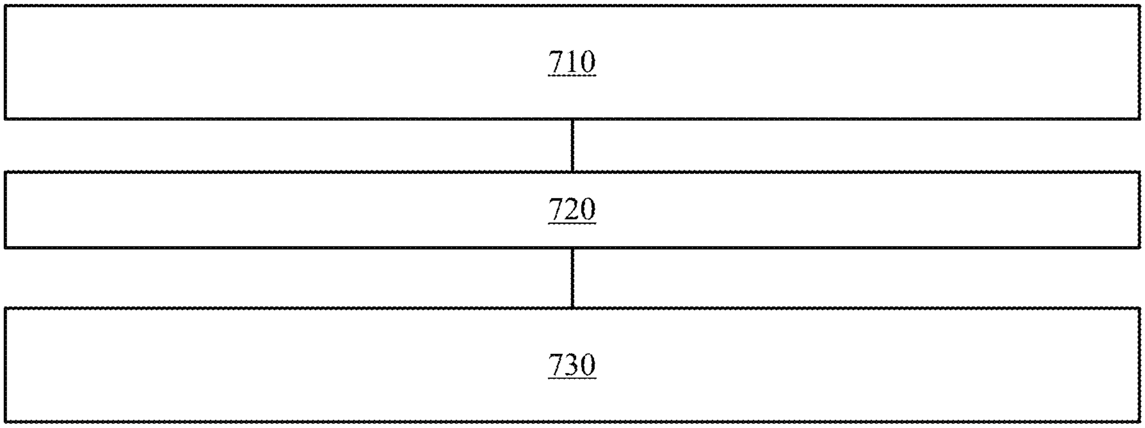
FIG. 7 illustrates an example of a method.

FIG. 7 illustrates method 700.

Method 700 may be executed by a system—such as system 10 of FIGS. 2-4.

Method 700 may start by step 710 of receiving, by a central control unit of the system, UAV indicators about at least one unmanned airborne vehicle (UAV) located within the one or more monitored areas; wherein the UAV indicators are generated by a preprocessing step that comprises extracting information that is embedded within sensed UAV communication, the sensed UAV communication is sensed by at least one sensor of a group of sensors.

Step 710 may be followed by step 720 of aggregating, by a central control unit, the UAV indicators, to provide aggregated information.

Step 720 may be followed by step 730 of responding to the aggregated information, wherein the responding may include allocating tasks based on the aggregated information and executing the tasks by at least one of (i) one or more UAV disruption units of the system, (ii) one or more sensors of the system.

Any of the mentioned above methods may be executed by a system that include the central control unit and one or more sub-units. Such a system may execute any of the methods illustrated above and in addition may execute one or more additional steps such as executing a monitoring task, executing a disruption task, sensing UAVs, generating UAV indicators, and the like.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for processing information related to one or more monitored areas, the method comprises:

receiving, by a central control unit, UAV indicators about at least one unmanned airborne vehicle (UAV) located within the one or more monitored areas; wherein the UAV indicators are generated by a preprocessing step that comprises extracting information that is embedded within sensed UAV communication, the sensed UAV communication is sensed by at least one sensor of a group of sensors that are radio frequency (RF) sensors;

aggregating, by a central control unit, the UAV indicators, to provide aggregated information; wherein the aggregating comprises aggregating different UAV indicators generated by different sensors of the group of sensors the different sensors are distributed over different locations to monitor different areas, the UAV indicators are related to a same UAV of the at least one UAV; and responding to the aggregated information, wherein the responding comprises at least one out of (i) outputting the aggregated information, and (ii) storing the aggregated information.

2. The method according to claim 1 wherein the aggregating of the different UAV indicators generated by the different sensors comprises eliminating duplications.

3. The method according to claim 1 wherein the responding comprises determining disruption tasks based a on a risk imposed by the at least one UAV, the risk is determined based on a payload type of each one of the at least one UAV, wherein the payload type is selected out of a communication payload, a jamming payload, an explosive payload, a disposable payload, and a non-disposable payload.

4. The method according to claim 1 wherein the responding comprises determining one or more disruption tasks to be applied against at least one target UAV of the at least one UAV.

5. The method according to claim 4 wherein the determining of the one or more disruption tasks comprises selecting at least one target UAV of the at least one UAV.

6. The method according to claim 1 wherein the responding comprises determining not to execute any disruption task.

7. The method according to claim 1 wherein the responding comprises suggesting one or more disruption tasks to be applied against at least one target UAV of the at least one UAV.

8. The method according to claim 1 wherein the responding comprises receiving one or more disruption tasks to be applied against at least one target UAV of the at least one UAV.

9. The method according to claim 1 wherein the responding comprises receiving an allocation of one or more disruption tasks to one or more UAV disruption units.

10. The method according to claim 1 wherein the responding comprises allocating, to UAV disruption units, disruption tasks related to a certain UAV of the at least one UAV.

11. The method according to claim 10 wherein the disruption tasks differ from each other by transmission frequencies of disruption signals associated with the different disruption tasks.

12. The method according to claim 10 wherein the disruption tasks differ from each other by timing of transmissions of the disruption signals associated with the different disruption tasks.

13. The method according to claim 10 wherein the disruption tasks comprises (a) a first disruption task of interrupting a reception by the certain UAV, of a legitimate signal sent to the UAV by a remote controller of the UAV, and (b) a second disruption task of sending a false signal for taking over the UAV.

14. The method according to claim 10 wherein the disruption tasks comprises (a) a first disruption task of disrupting communication conveyed over a first communication channel, and (b) a second disruption task of disrupting a second communication channel.

15. The method according to claim 14 wherein the second communication channel is at least one of an auxiliary communication channel, an emergency communication channel, a reconnect communication channel, or a restart communication channel.

16. The method according to claim 1 wherein the responding comprises allocating one or more disruption tasks to one or more UAV disruption units, the one or more disruption tasks are for disrupting at least one target UAV of the at least one UAV, wherein the allocating comprises selecting the UAV disruption units of a set of UAV disruption units, where the selecting is based on (i) power supply parameters of the UAV disruption units of the set, and on (ii) a maximal power of a transmitted disruption signal by each one of the set of UAV disruption units.

17. A non-transitory computer readable medium that stores instructions for:

receiving, by a central control unit, UAV indicators about at least one unmanned airborne vehicle (UAV) located within one or more monitored areas;

wherein the UAV indicators are generated by a preprocessing step that comprises extracting information that is embedded within sensed UAV communication, the sensed UAV communication is sensed by at least one sensor of a group of sensors that are radio frequency (RF) sensors;

aggregating, by a central control unit, the UAV indicators, to provide aggregated information; wherein the aggregating comprises aggregating different UAV indicators generated by different sensors of the group of sensors the different sensors are distributed over different locations to monitor different areas, the UAV indicators are related to a same UAV of the at least one UAV and responding to the aggregated information, wherein the responding comprises at least one out of (i) outputting the aggregated information, and (ii) storing the aggregated information.

18. A central control unit for monitoring one or more monitored areas, wherein the central control unit is configured to:

receive UAV indicators about at least one unmanned airborne vehicle (UAV) located within one or more monitored areas; wherein the UAV indicators are generated by a preprocessing step that comprises extracting information that is embedded within sensed UAV communication, the sensed UAV communication is sensed by at least one sensor of a group of sensors that are radio frequency (RF) sensors;

aggregate the UAV indicators, to provide aggregated information; wherein the aggregating comprises aggregating different UAV indicators generated by different sensors of the group of sensors the different sensors are distributed over different locations to monitor different areas, the UAV indicators are related to a same UAV of the at least one UAV; and respond to the aggregated information, wherein the responding comprises at least one out of (i) outputting the aggregated information, and (ii) storing the aggregated information.

* * * * *